(12) United States Patent
Page (10) Patent No.: US 10,389,700 B1
(45) Date of Patent: *Aug. 20, 2019

(54) SYSTEM AND METHOD FOR RECEIVING INFORMATION AMONG COMPUTER SYSTEMS WITHOUT ENABLING LOG INS IF THE USER IDENTIFIERS ARE COMPROMISED

(71) Applicant: Charles Schwab & Co., Inc., San Francisco, CA (US)

(72) Inventor: William Page, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,601

(22) Filed: Nov. 26, 2018

Related U.S. Application Data (63) Continuation of application No. 13/686,704, filed on Nov. 27, 2012, now Pat. No. 10,142,307.

(60) Provisional application No. 61/563,814, filed on Nov. 27, 2011.

(51) Int. Cl.
 *H04L 29/06* (2006.01)

(52) U.S. Cl.
 CPC .................................. *H04L 63/08* (2013.01)

(58) Field of Classification Search
 USPC ............ 726/2, 4, 21, 36; 713/150, 163, 181; 380/255, 264, 276
 See application file for complete search history.

(56) References Cited

U.S. PATENT DOCUMENTS

| | | | | |
|---|---|---|---|---|
| 7,421,714 B1* | 9/2008 | Orling | ..................... | G06F 9/485 719/328 |
| 2006/0242273 A1* | 10/2006 | Fiducci | ................. | H04L 63/083 709/220 |
| 2008/0003964 A1* | 1/2008 | Alperin | ............... | H04M 3/5233 455/185.1 |
| 2012/0173348 A1* | 7/2012 | Yoo | ........................ | G06Q 20/10 705/16 |
| 2013/0179469 A1* | 7/2013 | Fiducci | ................. | H04L 63/083 707/784 |

\* cited by examiner

*Primary Examiner* — Sharif E Ullah
(74) *Attorney, Agent, or Firm* — Innovation Partners; Charles E. Gotlieb (57) ABSTRACT

A system and method allows a matching system to mediate requests for information among different computer systems without storing information that can be used to log into those computer systems.

9 Claims, 4 Drawing Sheets

SYSTEM AND METHOD FOR RECEIVING INFORMATION AMONG COMPUTER SYSTEMS WITHOUT ENABLING LOG INS IF THE USER IDENTIFIERS ARE COMPROMISED

RELATED APPLICATION

This application is a continuation of U.S. patent application Ser. No. 13/686,704 entitled. "System and Method for Receiving Information Among Computer Systems Without Enabling Log Ins if the User Identifiers are Compromised" filed by William Page on Nov. 27, 2012, which claims the benefit of U.S. Provisional Patent Application Ser. No. 61/563,814 entitled, "Method and Apparatus for Receiving Information Among Computer Systems Without Enabling Log Ins if the User Identifiers are Compromised" filed on Nov. 27, 2011 by William Page, each application having the same assignee as the present invention and each application hereby incorporated by reference in its entirety.

FIELD OF THE INVENTION

The present invention is related to computer software and more specifically to computer software for requesting information among accounts on different computer systems without enabling a party stealing account information to log in.

BACKGROUND OF THE INVENTION

Computer systems may be operated by entities that are independent from one another. Independent entities are those in which one entity does not control the other and vice versa.

In certain applications, the computer system of one entity may require information from an account at the computer system of a different entity. This may occur if a user has accounts on multiple computer systems and one computer system will consolidate data from other computer systems that provide the data, or one computer system has a more desirable user interface and feature set than the computer system holding the data, and so it is desirable for the user to view the data on the computer with the more desirable user interface or feature set. It would therefore be desirable to allow the information from the user's account on at least one first computer system to be requested and received by the user's account at a second computer system.

Conventional computer systems accomplish this transfer of information among independently operated computer systems by the user providing the log in information for the computer system that will provide the data to the computer system that will be retrieving it. The retrieving computer system logs in to the providing computer system and supplies the user's user identifier and password it received from the user and obtains the data from the providing computer system.

However, this arrangement is suboptimal and a better way of retrieving data could be desirable.

SUMMARY OF INVENTION

A system and method allows a user to register at different types of computer systems: data provider systems and data consolidator systems. A data consolidator system may consolidate data from multiple data provider systems or from a single data provider system. A data consolidator system may provide data to other data consolidator systems. At one or both types of systems, the user will provide information that can be used to authenticate the user via a text message, phone call or e-mail by providing a phone number or e-mail address or other similar information.

When a user wishes to allow a data consolidator system to retrieve data from the user's account or accounts at a data provider system, the data consolidator system issues an opaque user identifier to the user, or if an opaque user identifier has already been issued to that user, obtains that opaque identifier, and the data consolidator system will cause the user's browser to establish a connection with a matching system, described below, provide the opaque user identifier to the matching system, an identifier of the data consolidator system, and an identifier of the data provider system, and request a web page that allows the user to provide the user's user identifier and password on the data provider system to user interface elements in the web page. The user provides the user's user identifier and password of the data provider system to the web page and presses a submit button, in order to allow the matching system to set up data retrieval from that data provider system. In one embodiment, the user may receive a limited time use user identifier and/or password from the data provider system to supply to the matching system so that the user does not have to supply his or her actual data provider system user identifier to the matching system.

The matching system may be an application running on a separate computer system or on one of the data provider systems or data consolidator systems. In one embodiment, the data provider system may be operated by or for an entity that is independent from the entity for which the data consolidator system is operated, and the matching system may be operated by or for an entity that is independent from only one or both such entities.

An opaque user identifier is an identifier used to uniquely identify a user, though an opaque user identifier may identify an individual account of a user in other embodiments. An opaque user identifier is not required to log in natively to the system that issued it. In one embodiment, an opaque user identifier is an identifier that can be used to retrieve data, but cannot be used to perform other functions such as setting up accounts or initiating or authorizing transactions. The system that issues an opaque user identifier could allow some functions to be performed with the opaque user identifier but not others. For example, the system could enforce a rule that data may be retrieved using an opaque user identifier, but only some or none of the other functions a user could perform by logging in could be performed with an opaque user identifier.

The matching system sends a request for an opaque user identifier to the data provider system whose identifier it receives, and includes the user supplied user identifier and password. The data provider system may optionally authenticate the user by sending an out of band authorization request to the user, using an address or phone number or other address that may be used to contact the user and receives a response from the user. The response to the authorization request may be sent by the user directly to the data provider system or it may involve sending a response via a response page the user receives after the user presses the submit button.

If the user is authenticated by the data provider system, it returns an opaque user identifier to the matching system in response to the request. If an opaque user identifier has previously been issued by the matching system for that user, that opaque user identifier is sent by the data provider system, and otherwise, the data provider system issues one to the user and sends the one it issues to the matching system in the response.

The matching system associates an identifier of the data consolidator system and the opaque user identifier it received from the data consolidator system, with the opaque user identifier it received from the data provider system and an identifier of the data provider system. The identifiers of the system may be issued by the matching system as part of the registration of those systems with the matching system, and may be referred to as channel identifiers. The matching system performs an initial, and after the initial one, an occasional, authentication of the other systems with which it communicates. The identifier of the different systems may be made based upon the authenticated session used to communicate.

After the steps above have been performed for a given user, the data consolidator system may provide a data request to the matching system, along with an identifier of the data provider system from which data is being requested and the opaque user identifier on the data consolidator system of the user for which data is being requested. The matching system looks up the opaque user identifier associated with the identifier of the data consolidator system from which the data request was sent, and determines if it has associated an opaque user identifier with such information and the data provider system in the request. If not, it denies the request to the data consolidator system. If so, it forwards the opaque user identifier to the specified data provider system and the identifier of the data consolidator system from which the request was received.

The data provider system logs the request and returns to the matching system transaction data and data regarding changes made to the user's accounts (e.g. added an account or closed an account) made since any prior request for data for that user was received from the same data consolidator system, or the data consolidator system logs the request and sends as part of the request the date and time from the last time it sent a request for data for that user, and the data provider system will send only the above data that it recorded since the specified date and time. The above information is only sent for accounts to which the user has access at the time of the request, and so the data provider system checks for such access before it sends the data.

If the user no longer has access to one or more accounts to which the user formerly had access, the data for those accounts for which access is no longer allowed will not be provided, or will not be provided as of the date and time access was revoked. If the user corresponding to the opaque user identifier is granted access to an account to which access was not allowed by that user when any prior request for that user was received, the data for the account since the date and time access was granted to the user, or all transaction data for that account, is provided.

The matching system forwards the transaction data and data regarding changes to the user's accounts to the data consolidator system, which may display some or all of the data to the user. The user may then use such data to make investment decisions.

In one embodiment, the data provider system will only send the above data for accounts the user is authorized to view or process. If the user is no longer authorized to view or process an account, for any such account, transaction data and data regarding changes to the users accounts will no longer be provided as part of the request, or only the information on or before the date and time the user was no longer authorized to view or process such data, and only information on or after the date and time the user became initially authorized to view or process such data is provided by the data provider system as described above.

If a thief steals the opaque user identifiers, for example, from the matching system, the data consolidator systems and the data provider systems will not allow the thief to log into the user's accounts, even if the thief somehow obtains the passwords for those users.

BRIEF DESCRIPTION OF THE DRAWINGS

FIG. 2, consisting of FIGS. 2A and 2B is a flowchart illustrating a method of setting up data retrieval and retrieving data from one computer system to another computer system according to one embodiment of the present invention.

FIG. 3 is a flowchart illustrating a method of preventing an unauthorized logons using an opaque user identifier according to one embodiment of the present invention.

DETAILED DESCRIPTION OF A PREFERRED EMBODIMENT

Figure 1:
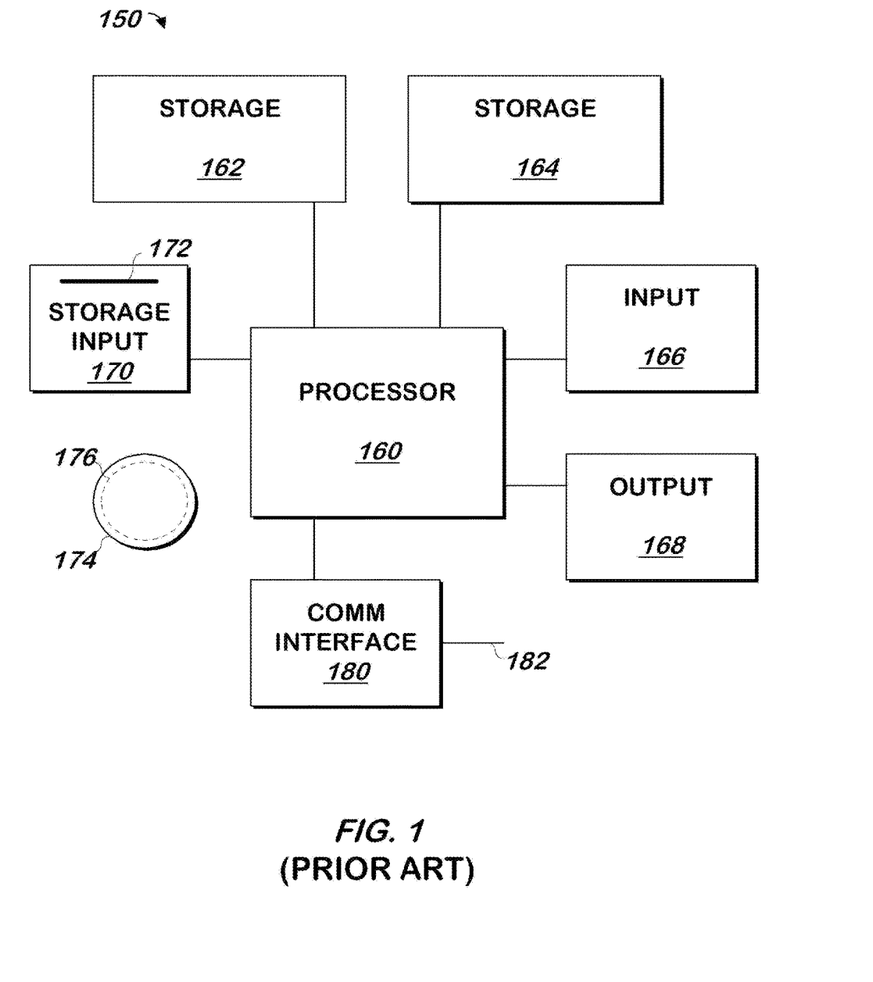
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORA- TION of Redwood Shores, Calif., a PENTIUM-compatible personal computer system such as are available from DELL COMPUTER CORPORATION of Round Rock, Tex. running a version of the WINDOWS operating system (such as XP, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
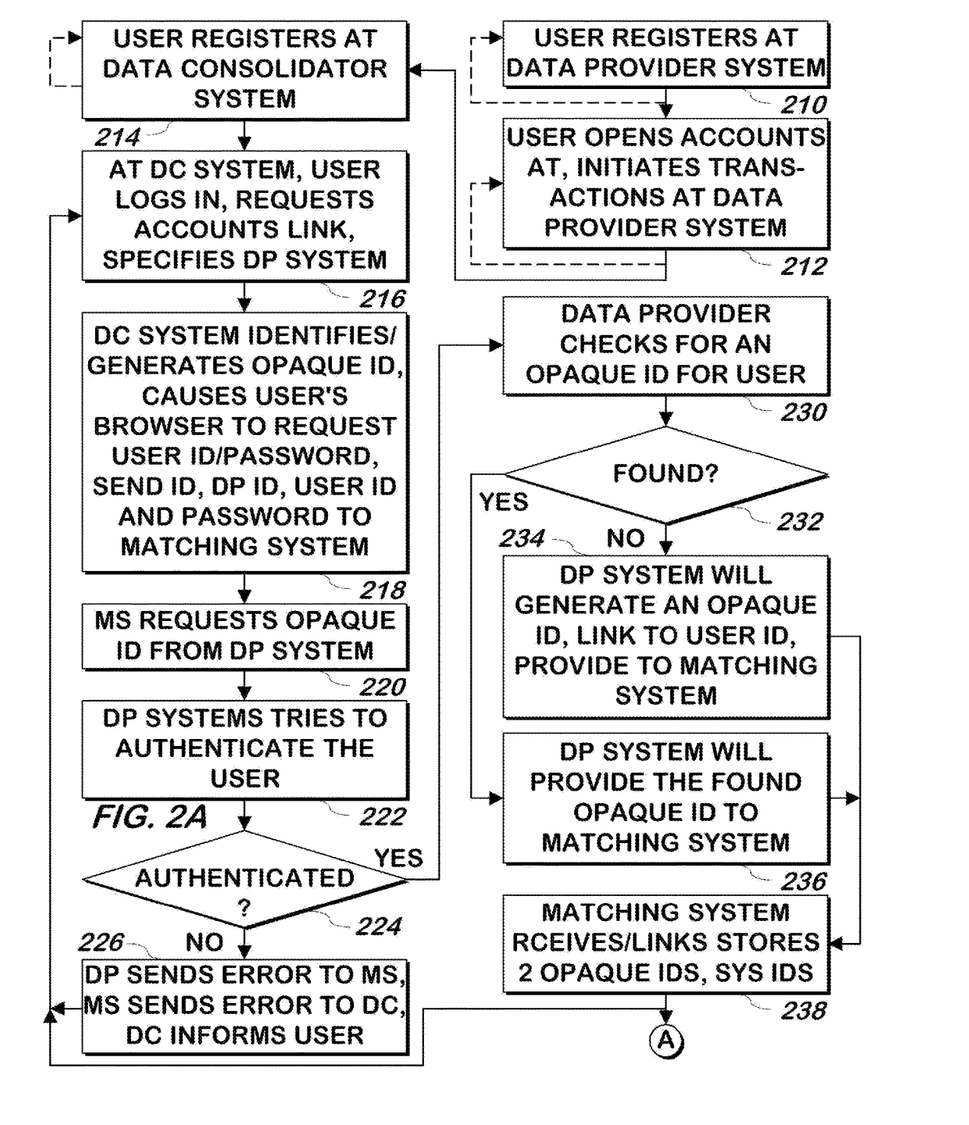
Figures 2B, 3:
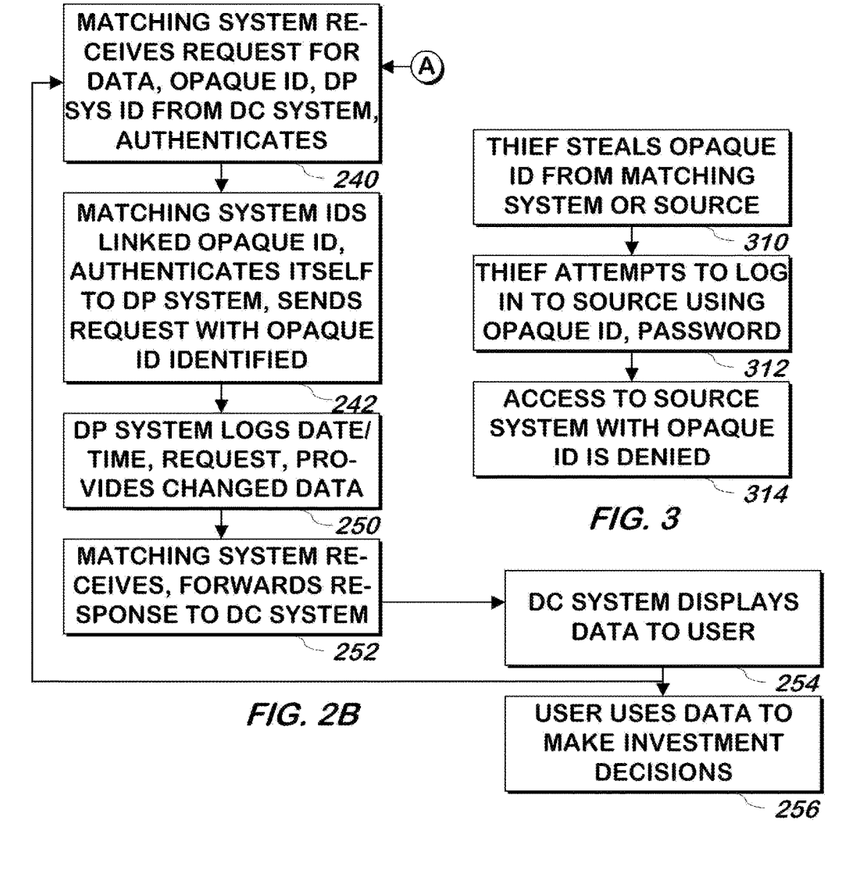

FIG. 2, consisting of FIGS. 2A and 2B is a flowchart illustrating a method of consolidating data using opaque identifiers according to one embodiment of the present invention. The data is collected from one or more data provider systems and consolidated at a data consolidator system through a matching system. There may be one or more of each type of system, and each system is connected to one or more matching systems through a network, typically an Ethernet connection or an internet connection or both.

Users may be registered at data provider systems and data consolidator systems, and any number of users may be registered at any system at any time.

User Registers at Data Provider System.

Referring now to FIG. 2A of FIG. 2, the user is registered 210 at the data provider system. The user is registered at the data provider system by providing a data provider (DP) user identifier, along with a corresponding DP password. The user may be registered, or have their registration information updated, with one or more different data provider systems, and the user may be registered with any data provider system at any time. In one embodiment, the registration of the user at a data provider system is an independently operating process, as shown by the dashed lines in the Figure. The DP user identifier and DP password provided at one data provider system may or may not be identical to the user identifier and password provided at another data provider system.

In one embodiment, information that may be used to perform an out-of-band method of authentication is also provided as part of the registration information received by the DP system as part of step 210. The out-of-band method of authentication is a method by which the data provider system may verify the identity of the user at a later time. The information provided by the user for such authentication may include a telephone number at which the user may receive text messages or telephone calls, or an email address at which the user may receive electronic messages. The out-of-band method of authentication may be one or more of any number of different methods of authentication.

User Opens Accounts at, Initiates Transactions at Data Provider System.

An account is opened, or a transaction is initiated, at the data provider system 212. If the user wishes to add an account, a new account may be opened for the user. If an account already exists for the user at the data provider system, then a transaction may be initiated at the data provider system. Transactions may be initiated by the user at any time, or by a separate entity, such as a merchant or vendor. In one embodiment, a transaction initiated by the user may include a balance transfer from one user account to another user account, or it may include the payment of an outstanding bill from the user account to a vendor account for goods or services rendered. In one embodiment, a transaction initiated by a separate entity may be a charge to the user account, such as on a credit card, authorized by the user at another location, such as at a retail store. Any number of user accounts may be opened at any time, and any number of account transactions may be initiated at any time, at any number of different data provider systems. The process of the account(s) being opened or the transaction(s) being initialized is an independently occurring process, as shown by the dashed line in the Figure at step 212.

User Registers at Data Consolidator System.

The user is registered 214 at a data consolidator system. The user is registered at the data consolidator system in a manner similar to the method of registering the user at a data provider system, as described above, with a data consolidator (DC) user identifier and corresponding DC password. The user may be registered at any number of data consolidator systems at any time, and the process of registering the user at the data consolidator system is an independently occurring process, as shown by the dashed lines in the Figure.

At Data Consolidator System, User Logs in, Requests Accounts Link, Specifies Data Provider System.

The user is logged in at the data consolidator system, and a link is requested between the user's DC account and a separate DP account at a specified data provider system 216. The user is logged into the data consolidator system using a DC username and a corresponding DC password that have been previously established with the user for the data consolidator system.

To request a link between a DC account and a DP account, link request information may be provided by the user at the DC system as part of step 216, and such a request is received by the DC system. The link request information may include the DP user identifier for the requested data, as well as an identifier for the data provider system associated with the requested account. The user may request any number of DP accounts to be linked for one or more data provider systems.

In one embodiment, the DP user identifier is a limited time use identifier issued by the data provider system that identifies the user account at the data provider system for a limited time and then is not related to the account. Such an arrangement may be used so that the user does not have to provide to the DP user identifier used to log in when the user requests the link between the DC account and the DC account. The DP user identifier is recognized by the data provider system as an alternate user identifier for the account for a limited time after the user requests it.

Data Consolidator System Identifies/Generates Opaque Identifier, Sends Opaque Identifier and Request to Matching System.

A DC opaque identifier is identified or generated for the DC user account, and the DC opaque identifier, along with the link request information received as described above, is sent to the matching system by the data consolidator system 218. If no DC opaque identifier has been previously associated with the DC user account with which the user has logged in, in the manner described above, then a unique DC opaque identifier is generated for the DC user account by data consolidator 218. The generated DC opaque identifier is associated with the DC user account and stored at data consolidator system.

If a DC opaque identifier for the user's DC account is already associated with the DC account, then it is identified by data consolidator system 218.

The DC opaque identifier already associated with, or generated for, the DC account is sent by data consolidator system to the matching system 218. As noted above, in one embodiment, the DC opaque identifier is sent to the matching system with the link request information received from the user as detailed above.

Sending the Opaque Identifier to Matching System with Authentication Information.

In one embodiment, the data consolidator system sends the opaque user identifier it generates and the identifier of the data provider system for which the link request is being made as part of a request for a web page that it causes the user's browser to make to the matching system. In this embodiment, instead of requesting the user identifier for the DP system, the DC system causes the user's browser to spawn a new window and send a request for a link request web page to the matching system, the request containing the above information, for example, in referrer information included to the right of the URL after a slash. Such information may be encrypted using the public key of the matching system for security purposes.

The matching system receives the request, and returns a web page with such information as a variable, along with username and password text boxes to allow the user to provide the user's username and password for the data provider system, either of both of which may be limited time use user identifier or password, received as described herein. In one embodiment, the matching system looks up the name of the data provider system in a table of data provider identifiers and names it maintains, and includes on the web page the name of the data provider system it locates, and in another embodiment, such information is provided by the DC system with the request using a similar table it maintains. The user enters the user's user identifier and password for the specified data provider system and presses a submit button that the matching system has included as part of the page. The matching system will thus receive the username and password along with the other information included in the link request. In the embodiment that information in the request was encrypted, it may be decrypted by the matching system once it is received with the username and password.

Matching System Requests Opaque Identifier From Data Provider System.

The DP user identifier is sent to the data provider system specified by the user, as described above, by the matching system, and a corresponding DP opaque identifier is requested from the data provider system 220. Using the data provider system information included with the link request information, the specified data provider system is identified by the matching system, and the DP user identifier is sent by the matching system to the specified data provider system as part of a request for a DP opaque identifier.

In the embodiment in which the username and password are not requested by the matching system as described above, the password received from the user is also sent to the data provider system with the request.

Data Provider System Tries to Authenticate the User.

An attempt is made to authenticate the user having the DP user identifier received in the request by the data provider system 222.

In the embodiment in which the password and user identifier are received from the user via the matching system, the user identifier and password are used to authenticate the user using conventional techniques.

In another embodiment, the attempt to authenticate the user is made using a conventional out-of-band method of authentication using the registration information provided earlier by the user, as described above. The user may provide the response out of band or may provide a response to the data consolidator system, which forwards the response to the data provider system via the matching system. In one embodiment, a serial number unique to each session is added to the communications by the data consolidator system to enable matching of communications to the proper session.

The User is not Authenticated.

Data Provider Sends Error Message to Matching System, Matching System Sends Error Message to Data Consolidator, and Data Consolidator Informs User.

If the user is not authenticated 224, then an error message is sent to the matching system by data provider system 226.

If the matching system receives an error message from the data provider system, then an error message is sent from the matching system to the data consolidator system in response to the request 226. Consequently, the user is informed of the error by the data consolidation system.

The User is Authenticated.

Data Provider Checks for DP Opaque Identifier for User.

If the user is authenticated 224, an attempt is made to identify a DP opaque identifier associated with the received DP user identifier by the DP system that received the request 230.

No DP Opaque Identifier is Found.

Data Provider System Generates an Opaque Identifier, Links Opaque Identifier to User Identifier, Provides to Matching System.

If no DP opaque identifier is found to be associated with the authenticated DP user account 232, then a unique DP opaque identifier is generated by the data provider system, stored in association with the authenticated DP user identifier and provided to the matching system 234.

A DP Opaque Identifier is Found.

Data Provider System Provides Found Opaque Identifier to Matching System.

If a DP opaque identifier is found to be associated with the DP user account 234, then the found DP opaque identifier is provided to the matching system 236.

Matching System Receives, Links/Stores the Two Opaque Identifiers.

The requested DP opaque identifier is received by the matching system, and a link is created and stored associating the received DP opaque identifier and corresponding DC opaque identifier 238. To create and store the link, the matching system associates the received DP opaque identifier with the DC opaque identifier that was received by matching system at step 218. In one embodiment, the link associating the two opaque identifiers also includes a DP system identifier associated with the data provider system from which the DP opaque identifier was provided and a DC system identifier associated with the data consolidator system from which the DC opaque identifier was received. Any number of opaque identifiers from any number of systems, DC or DP, may be linked in the manner described above by any number of matching systems.

Matching System Receives Request for Data, DC Opaque Identifier and DP Identifier from DC System, Authenticates.

A request for data is received by the matching system from a data consolidator system, and the data consolidator system and the matching system are authenticated to one another 240. In one embodiment, the request for data received from the data consolidator system may include the DC opaque identifier for a DC user account, as well as the DP system identifier for a specific data provider system from which the data is desired.

In one embodiment, the data consolidator system from which the request for data is received may be authenticated to the matching system receiving the request using a conventional system authentication method, such as a key or certificate exchange. The data consolidator system may be authenticated to the matching system any number of times, and the data consolidator system may be authenticated to the matching system at any time. The data consolidator system may be authenticated to the matching system when data is being requested or when data is not being requested. In one embodiment, the matching system may be reciprocally authenticated to the data consolidator system in a similar manner. Authentication may be performed periodically, such as once per day.

In one embodiment, the matching system may receive a request for data when a user logs into a data consolidator system or when the user manually makes a request for data to the data consolidator system, or the matching system may receive a request for data at specified times during the day, or at regular intervals with parameters provided by a user or a data consolidator system, or the matching system may receive a request for data at any time. The matching system may receive any number of requests for data from any number of data consolidator systems at any time.

Matching System Identifies Linked DP Opaque Identifier, Authenticates Itself to Data Provider System, Sends Request for Data with DP Opaque Identifier.

The DP opaque identifier that is linked with the received DC opaque identifier is located by the matching system from among the links created as described above, the matching system is authenticated to the data provider system corresponding to the received DP system identifier, and a MS request for data is sent from the matching system to the authenticated data provider system 242. To locate the linked DP opaque identifier, the matching system may extract the DP system identifier and DC opaque identifier received from the DP system in the request for data it receives, and identify the DC system either as a result of its previously authenticated IP address or from an explicit DC identifier contained in the data request, and the matching system finds the DP opaque identifier for the DC system specified in the request that has been previously linked to the DC opaque identifier for the DC system identifier. If no such linked DP opaque identifier is located by the matching system, the matching system may send an error message to the requesting data consolidator system.

In one embodiment, the matching system and the identified data provider system may be authenticated to one another in a manner similar to the method described above by which a matching system and a data consolidator system may be authenticated to one another. The matching system and data provider system may be authenticated to one another any number of times at any time. In one embodiment, the DP system, matching system or DC system may be considered trusted by either or both other systems and no authentication is required.

In one embodiment, the MS request for data is sent by the matching system to the optionally authenticated data provider system specified in the received request, and the MS request for data may include the linked DP opaque identifier corresponding to the received DC opaque identifier described above and the identifier of the DC system from which the request was received as described above. The method continues at step 250 of FIG. 2B.

Data Provider System Logs Date/Time and Request, Provides Changed Data.

Referring now to FIG. 2B of FIG. 2, the MS request for data is received by the data provider system, the MS request is recorded in a MS request log with the date and time of the request, and any changed data is identified and provided to the matching system by the data provider system 250. In one embodiment, the request for data may be received by a data provider system from a matching system that has been authenticated to the data provider system, as described above.

An MS request log at the data provider system may include the date and time of every MS request for data, along with a requester identifier for the system from which the request is received. In one embodiment, the requester identifier may be an identifier for the data consolidator system requesting the data contained in the MS request for data.

Changed data corresponding to a DP user account corresponding to the DP opaque identifier received in the MS request for data is identified by the data provider system as information regarding transactions or the account that has been added, deleted, or altered since the last MS request for data was received from the same requester for that DP opaque identifier or since the date and time specified in the MS request for data. In one embodiment, the changed data corresponding to a DP user account that is provided to one matching system, may or may not be the same as the changed data identified and provided to a different requester for the same account.

If the user no longer has access to one or more accounts to which the user formerly had access, the data for those accounts for which access is no longer allowed will not be provided, or will not be provided as of the date and time access was revoked, as part of step 250. If the user corresponding to the opaque user identifier is granted access to an account to which access was not allowed by that user when any prior request for that user was received, the data for the account since the date and time access was granted to the user, or all transaction data for that account, is provided as part of step 250.

Matching System Receives, Forwards DP Response to DC System.

The matching system receives the changed data requested from the data provider system and forwards the changed data to the requesting DC system as a response to its request 252.

DC System Displays Data to User.

The data consolidator system receives the changed data from the matching system and displays relevant data to the user 254. In one embodiment, relevant data to be displayed may be determined by the data consolidator system, or by the DC system user, or by both the data consolidator system and the DC system user, or by some other system or systems.

User Uses Displayed Data to Make Investment Decisions.

The data displayed by the data consolidator system is used by the DC user to make investment decisions 256. In one embodiment, the data displayed by the data consolidator system may be used to make investment decisions, or decisions not related to investments, or any decisions.

Thief Steals Opaque Identifier from Matching System or Source.

FIG. 3 is a flowchart illustrating a method of defending against identity theft according to one embodiment of the present invention. Referring now to FIG. 3, an opaque identifier is stolen 310 from a matching system or a source system. The stolen opaque identifier may be a DC opaque identifier taken from a data consolidator system or it may be a DP opaque identifier taken from a data provider system, or it may be an any opaque identifier taken from a matching system. In one embodiment, additional information corresponding to the stolen opaque identifier may also be stolen, such as a password, or other user identifier information stored in association with the stolen opaque identifier at the source system.

Thief Attempts to Login to Source Using Opaque Identifier, Password.

An attempt is made 312 to login to a source system using the stolen opaque identifier, optionally along with a password or other information stolen in association with the stolen opaque identifier. In one embodiment, the attempt to login may be made manually, or it may be made by an automated system, and any number of login attempts may be made at one or more source systems.

Access to Source System with Opaque Identifier is Denied.

The attempt to login to the source system using an opaque identifier is denied 314. In one embodiment, an opaque identifier generated by a data consolidator system or a data provider system may not be used to login at the system that generated the opaque identifier or at any other system. System.

Figure 4:
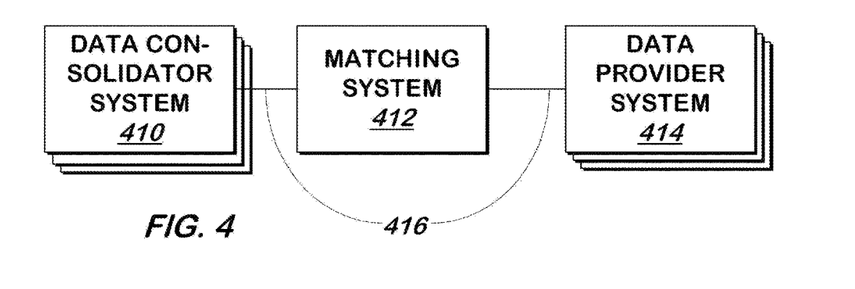
FIG. 4 is a block schematic diagram of a system for setting up data retrieval, retrieving data from one computer system to another computer system and preventing unauthorized logons using an opaque user identifier according to one embodiment of the present invention.

FIG. 4 is a block schematic diagram of a system for requesting information stored in an account on one computer system from a different computer system without providing an identifier that can be used to log into the account according to one embodiment of the present invention.

In one embodiment, the system contains any number of data consolidator systems 410, a matching system 412 and any number of data provider systems 414, though other arrangements may be used. Data consolidator systems 410 and data provider systems 414 operate as described herein, and communicate with matching system 412 via network 416, which may include a conventional Ethernet network, the Internet or both.

Figure 5:
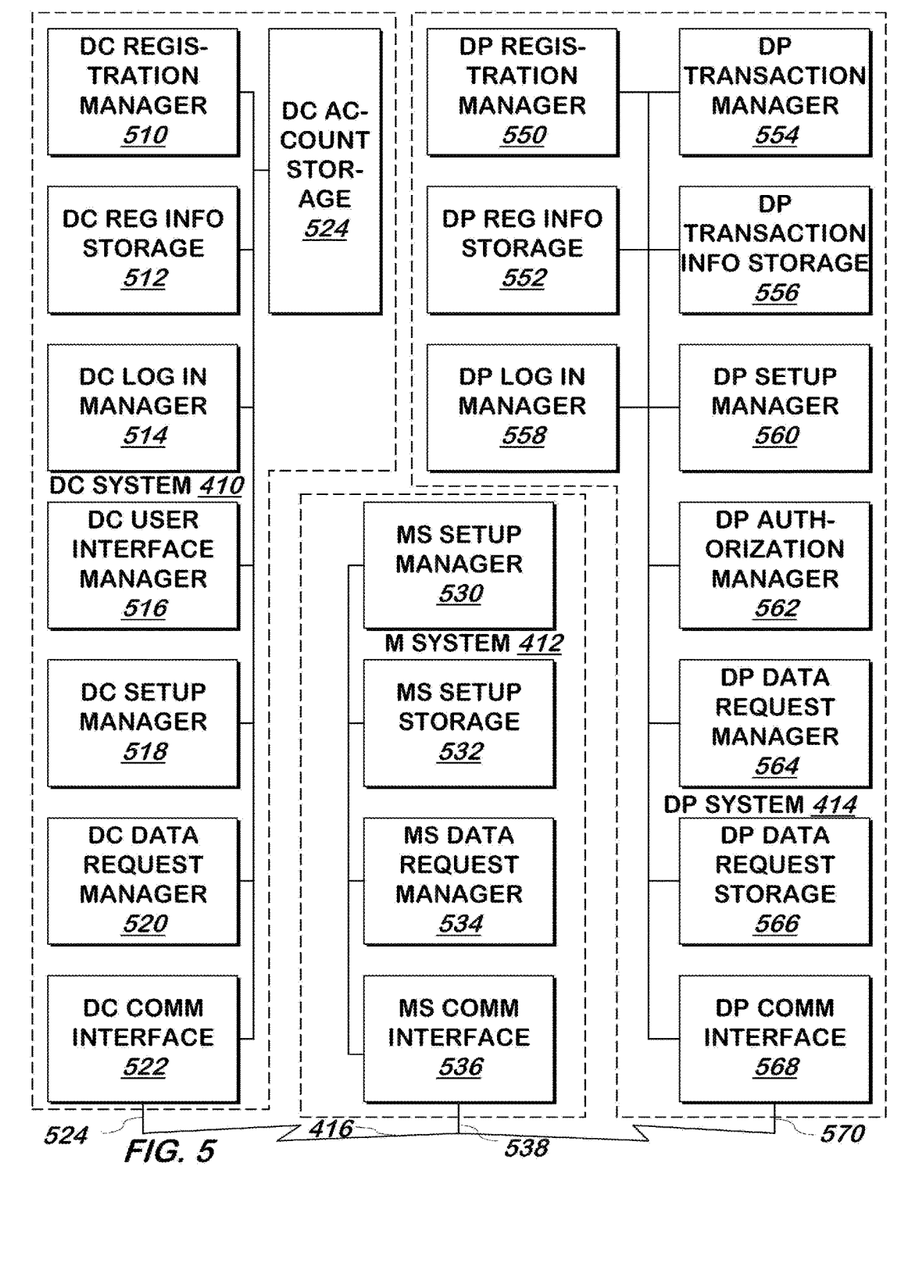
FIG. 5 is a block schematic diagram of the system of FIG. 4 shown in more detail according to one embodiment of the present invention.

Referring now to FIG. 5, a representative data consolidator system 410, matching system 412 and data provider system 414 are shown in more detail according to one embodiment of the present invention.

Each system 410, 412 and 414 includes a respective communication interface 522, 536, 568, each of which may include a conventional communication interface running suitable communication protocols, such as Ethernet, TCP/IP or both. In one embodiment, unless otherwise noted herein, all communication with each of the systems 410, 412 and 414 are made via its respective input/output 524, 538, 570 of its respective communication interface 522, 536, 568.

A user registers with the data provider system 410 using a separate user system (not shown) that may include a conventional personal computer system with a conventional browser coupled to the Internet using suitable communications techniques. When the user requests a web page from data provider communication interface 568, data provider communication interface 568 provides the request to data provider logon manager 558, which builds a web page that allows the user to log in, or to click a link to register, and returns the web page to the user in response. The link to register that data provider logon manager 558 builds specifies data provider registration manager 550. If the user clicks the link, the user's browser will request a web page from data provider registration manager 550.

When it receives the request, data provider registration manager 550 builds a web page containing suitable user interface elements that allow the user to provide the registration information described above and returns it to the user's browser in response. The user fills out the web page with the registration information described above and presses a submit button, which submits the information to data provider registration manager 550, which validates the information (for example checking for a username that is already registered, etc.) and if the validation is successful, stores such information into data provider registration information storage 552.

The user may log in to data provider log in manager 558 using conventional techniques and click on a link to receive a web page from data provider transaction manager 554 that allows the user to open an account. If the user fills out the web page and presses a submit button, the information on the web page the user supplied will be provided to data provider transaction manager 554, which opens the account and stores information regarding the account, including the DP user identifier, into data provider transaction storage 536, along with a timestamp indicating when the account information was stored, the timestamp having been obtained from a system clock (not shown).

The user registers with the data consolidator system 414 using the separate user system (not shown) described above. When the user requests a web page from data consolidator communication interface 522, data provider communication interface 522 provides the request to data consolidator logon manager 514, which builds a web page that allows the user to log in, or to click a link to register, and returns the web page to the user in response. The link to register at data consolidator logon manager 514 builds specifies data consolidator registration manager 510. If the user clicks the link, the user's browser will request a web page from data consolidator registration manager 510.

When it receives the request, data consolidator registration manager 510 builds a web page containing suitable user interface elements that allow the user to provide the registration information described above and returns it to the user's browser in response. The user fills out the web page with the registration information described above and presses a submit button, which submits the information to data consolidator registration manager 510, which validates the information (for example checking for a username that is already registered, etc.) and if the validation is successful, stores such information into data consolidator registration information storage 512.

The user may log into data consolidator log in manager 514 using conventional techniques and click on a link to receive a web page from data consolidator setup manager 518 that allows the user to request a link be established between the user's data consolidator account and one or more accounts that the user may have at any data provider system 414. If the user fills out the web page and presses a submit button, the information on the web page the user supplied will be provided to data consolidator setup manager 518. In one embodiment, the data consolidator setup manager 518 may receive link request information from the user which includes a data provider (DP) user identifier corresponding to the data provider account that the user wishes to link, and a DP system identifier corresponding to the data provider system that provides access to the requested account.

When data consolidator setup manager 518 receives the link request information, data consolidator setup manager 518 identifies any DC opaque identifier stored in association with the user's DC user identifier in data consolidator registration information storage 512. If no DC opaque identifier is found, data consolidator setup manager 518 generates a unique DC opaque identifier for the account and stores the generated DC opaque identifier associated with the user account information in data consolidator registration information storage 512.

In-Band Authentication.

In one embodiment, when data consolidator setup manager 518 has identified or generated a DC opaque identifier, it causes the user's browser to spawn a new window. In one embodiment, the new window contains: A) a web page built by data consolidator setup manager 518 that contains user interface elements allowing the user to specify the user's username and password on the data provider system corresponding to the request and a submit button that will submit such information to matching system setup manager 530, as well as B) the identifiers of the data provider system and the data consolidator systems corresponding to the request. In one embodiment, instead of spawning such a page, it redirects the user to request a web page from matching system setup manager 530 that contains such user interface elements and a submit button as described above, with the request specifying the identifiers of the data provider system and the data consolidator system.

If matching system setup manager 534 receives the request for a web page, matching system setup manager 534 provides the web page as described above, optionally using the table described above that is stored in matching system setup storage 532. Matching system setup manager 534 receives the response or, in the case of the web page generated by data consolidator setup manager 518, receives the contents of the user interface elements and the identifiers, and provides the username and password as part of a DP setup request to data provider setup manager 560 of the identified data provider system, optionally encrypting the username and password using the public key of the data provider system.

When data provider setup manager 560 receives the DP setup request from matching system setup manager 534, data provider setup manager 560 sends an authentication request with the DP user identifier and password received with the DP setup request to data provider authorization manager 562.

When data provider authorization manager 562 receives the authentication request, data provider authorization manager 562 attempts to authenticate the username and password using conventional techniques by locating the username in data provider registration information storage 552 and comparing the password stored for that user with the one received. If the information received is authenticated, data provider authorization manager 562 sends an authentication verification message to data provider setup manager 560. In one embodiment, data provider authorization manager 562 sends the authentication verification with the DP user identifier corresponding to the DP user that was authenticated.

Out of Band Authentication.

In another embodiment, when data consolidator setup manager 518 has identified or generated a DC opaque identifier, data consolidator setup manager 518 sends the DC opaque identifier, along with the received DP system identifier and the user's DP user identifier, to matching system data request manager 534 as a DC setup request.

When matching system data request manager 534 receives a DC setup request, it identifies the request as a DC setup request and sends the DC setup request, with all the information it has received with the DC setup request except the DC system identifier, to matching system setup manager 530. In one embodiment, matching system data request manager 534 identifies the request as a DC setup request by a DC setup request header included with the request or some other header or indication received with the request.

When matching system setup manager 534 receives a DC setup request, matching system setup manager 534 identifies the data provider system associated with the DP system identifier received with the DC setup request, and sends a DP setup request to data provider setup manager 560 of the identified data provider system.

When data provider setup manager 560 receives the DP setup request from matching system setup manager 534, data provider setup manager 560 sends an authentication request with the DP user identifier received with the DP setup request to data provider authorization manager 562.

When data provider authorization manager 562 receives the authentication request, data provider authorization manager 562 attempts to authenticate the user by sending a message to the user according to the out-of-band method of authentication previously provided by the user, as described in the method above. In one embodiment, data provider authorization manager 562 retrieves out-of-band authentication information corresponding to the received DP user identifier, and that was previously stored in data provider registration information storage 552, as described above. Out-of-band authentication information may include the method previously chosen by the user for out-of-band authentication, such as by phone call, text message or email, as well as the information used to communicate via such methods, such as the user's phone number or email address.

Data provider authorization manager 562 waits to receive a response from the user as described above. If data provider authorization manager 562 does not receive authentication information from the user, in the manner described above, then data provider authorization manager 562 sends an error message to the requesting matching system setup manager 530 which sends an error message to the requesting data consolidator setup manager 518. In one embodiment, when data consolidator setup manager 518 receives the error message from matching system setup manager 530, data consolidator setup manager 518 provides the error message information to data consolidator user interface manager 516, which displays an error message to the data consolidator system user.

If data provider authorization manager 562 receives authentication information from the user, and such information is authenticated in the manner described above, then data provider authorization manager 562 sends an authentication verification message to data provider setup manager 560. In one embodiment, data provider authorization manager 562 sends the authentication verification with the DP user identifier corresponding to the DP user that was authenticated.

Locate or Generate Opaque Identifier and Provide it.

When data provider setup manager 560 receives the requested authentication verification from data provider authorization manager 562, data provider setup manager 560 attempts to locate a DP opaque identifier corresponding to the DP account identifier in data provider transaction information storage 566. If no such DP opaque identifier is identified, data provider setup manager 560 generates a unique DP opaque identifier for the DP user account, stores the generated DP opaque identifier with the DP user identifier in data provider transaction information storage 556, and provides the generated DP opaque identifier to matching system setup manager 530.

If data provider setup manager 560 identifies a DP opaque identifier corresponding to the DP user identifier that has been previously stored in data provider transaction information storage 556, as described above, data provider setup manager 560 provides the located DP opaque identifier to matching system setup manager 530.

When matching system setup manager 530 receives the requested DP opaque identifier from data provider setup manager 560, matching system setup manager 530 stores the DC opaque identifier received with the DC setup request, as described above, the DC system identifier corresponding to the data consolidator system from which the DC setup request was received, the DP opaque identifier requested and received from the data provider system, as described above, and the DP system identifier corresponding to the system from which it received the requested DP opaque identifier into matching system setup storage 532. In one embodiment, matching system setup manager 530 also sends a confirmation message to the data consolidator setup manager 518 from which the DC setup request was received above, and the confirmation message may include the DC opaque identifier received by matching system setup manager 530 with the DC setup request. Data consolidator system manager 518 stores the DP system identifier corresponding to the DC setup request with the user's registration information in data consolidator registration information storage 512.

Sending a Data Request.

In one embodiment, data consolidator request manager 520 sends a DC data request to matching system data request manager 534 when the user logs into his account, or when prompted by a user, such as when a user fills out a web page and presses a data request button, which submits the data request information to data consolidator request manager 520. In one embodiment, data consolidator request manager 520 may send a DC data request at set times each day or throughout the day, or data consolidator request manager 520 may send a DC data request at any time.

In the embodiment in which data consolidator request manager 520 sends a request when the user logs in, when the user is authenticated by data consolidator login manager 514, data consolidator login manager 514 provides the identifier of the user to data consolidator request manager 520. In the embodiment in which data consolidator request manager 520 sends a request when prompted by the user, data consolidator login manager 514 provides a user interface after it authenticates the user that includes a user interface control such as a button or link that allows the user to request data to be retrieved. If the user operates the user interface control, data consolidator login manager 514 provides the user identifier of that user to data consolidator request manager 520. In the embodiment in which data retrieval is scheduled, data consolidator request manager 520 sets a timer in the operating system and when the timer goes off, data consolidator request manager 520 selects the users that have an opaque user identifier stored in data consolidator registration information storage 512 one at a time and processes them as described below.

When it receives a user identifier or selects a user identifier, data consolidator request manager 520 retrieves each data provider system identifier stored associated with the user in data consolidator registration information storage 512 and retrieves the data for each such data provider using the data provider system identifier and the opaque user identifier as will now be described.

Data consolidator data request manager 520 sends a DC data request as a request for data corresponding to a specific data provider account from a specific data provider system to matching system data request manager 534. In one embodiment, data consolidator request manager 520 sends the DC data request with the DC opaque identifier that corresponds to the DC user account for which the data is being requested and a DP system identifier for the data provider system from which the information is being requested.

In one embodiment, data consolidator data request manager 520 stores the date, time and DP system identifier into DC account storage 524 associated with the user identifier on the data consolidator system to which the request corresponds. In this embodiment, the data consolidator data request manager 520 first retrieves from DC account storage 524 the date and time of the last fulfilled DC data request for that user identifier to that DP system identifier and includes such information in the request.

When matching system data request manager 534 receives the DC data request, matching system data request manager 534 optionally authenticates the data consolidator data request manager 520, as described above, and identifies the DP opaque identifier previously linked to the received DC opaque identifier, as described above. In one embodiment, matching system data request manager 534 locates the DP opaque identifier that has been previously stored in association with the received DC opaque identifier, along with the system identifiers for the requesting DC system and requested DP system, in matching system setup storage 532 in the manner described above.

When matching system data request manager 534 has identified the linked DP opaque identifier, it optionally authenticates itself to the data provider system specified in the DC data request by the DP system identifier, and sends a DP data request (referred to above as a MS request for data), including the linked DP opaque identifier it has retrieved from matching system setup storage 532, and the DC system identifier corresponding to the data consolidator system from which it received the DC data request, to data provider data request manager 564.

When data provider data request manager 564 receives a DP data request from matching system data request manager 534, data provider data request manager 564 logs the time and date of the DP data request in data provider data request storage 566 and provides changed data corresponding to the DP data request to matching system data request manager 534. To provide changed data corresponding to the DP data request to matching system data request manager 564, data provider data request manager 564 retrieves the DP user identifier that corresponds to the received DP opaque identifier from data provider transaction information storage 556. Data provider data request manager 564 then retrieves from data provider data request storage 566 the date and time of any previous DP data request received for the DP user account corresponding to the retrieved DP user identifier, as well as the DC opaque identifier that was received with the DP data request.

Using the date and time of the last DP data request retrieved above, as well as the retrieved DP user identifier, data provider data request manager 564 retrieves changed data corresponding to the identified DP user account as account and transaction information recorded in data provider transaction information storage 566 that corresponds to the retrieved DP user identifier and has been recorded, as described above, with a date and time which is after the date and time of the last DP data request for the identified DP user account, logged into data provider data request storage 566, as described below.

In one embodiment, if no previous DP data request has been logged into data provider data request storage 566 for the specified DP user account from the specified data consolidator system, data provider data request manager 564 provides all account and transaction information corresponding to the DP user identifier stored in data provider transaction information storage 556 to matching system data request manager 534, and optionally logs the date and time of the DP data request in the DP request log along with the corresponding DP user identifier and the DC system identifier for the requesting data consolidator account into data provider data request storage 566.

In one embodiment, data provider data request manager 564 retrieves the changed data corresponding to the identified DP user account and provides the changed data to matching system data request manager 534 along with the DP opaque identifier and DC system identifier it initially received from matching system data request manager 534 with the DP data request, and data provider data request manager 564 updates the DP request log for the identified DP user account with the new date and time of the latest DP data request from the specified data consolidator account in data provider data request storage 566. The changed data is the data since the date and time specified in the request or since the date and time logged in data provider request storage 566.

In one embodiment, if the user no longer has access to one or more accounts to which the user formerly had access, the data for those accounts for which access is no longer allowed will not be provided, or will not be provided as of the date and time access was revoked, by data provider data request manager 564. If the user corresponding to the opaque user identifier is granted access to an account to which access was not allowed by that user when any prior request for that user was received, the data for the account since the date and time access was granted to the user, or all transaction data for that account, is provided, by data provider data request manager 564.

When matching system data request manager 534 receives the requested changed data from data provider data request manager 564, matching system data request manager 534 forwards such data from data provider data request manager 564 to the requesting data consolidator data request manager 520 in response to the original DC data request.

When data consolidator data request manager 520 receives the requested data response from matching system data request manager 534, data consolidator data request manager 520 stores it into data consolidator account storage 524 associated with the user DC user identifier, marks the request date and time stored in DC account storage 524 as fulfilled, and signals data consolidator user interface manager 516 with the DC user identifier. In one embodiment, data consolidator data request manager 520 may time stamp the data it stores into data consolidator account storage 524 to allow data consolidator user interface manager 516 to identify newly received data.

When so signaled, data consolidator user interface manager 516 displays data to the user. In one embodiment, data consolidator user interface manager 516 builds a web page to display data to the user.

The user may use data that has been displayed by data consolidator user interface manager 516 to make various decisions, such as investment decisions.

If a thief acquires an opaque identifier, for example a DC opaque identifier or a DP opaque identifier that has been stolen from matching system setup storage 532, the thief may attempt to log in to a user account using the stolen opaque identifier. In one embodiment, the thief may use a stolen DC opaque identifier to attempt to log in with data consolidator log in manager 514, or the thief may use a stolen DP opaque identifier to attempt to log in with data provider log in manager 558, or the thief may use any DC or DP opaque identifier to attempt to log in to data consolidator log in manager 514 or data provider log in manager 558. For example, if the thief acquires a DC opaque identifier that has been previously generated by data consolidator setup manager 518, in the manner described above, and stored in matching system setup storage 534 by matching system setup manager 530, in the manner described above, the thief may attempt to log in to data consolidator log in manager 514 using the stolen DC opaque identifier.

In one embodiment, the thief may also acquire and attempt to use a password corresponding to the account that is associated with the opaque identifier, or additional information corresponding to the opaque identifier that is mistaken for a password.

If the thief attempts to log in to data consolidator log in manager 514 or data provider log in manager 558 with the opaque identifier, the log in attempt will be denied by them. In one embodiment, an opaque identifier generated by data consolidator setup manager 518 or data provider setup manager 560 is not recognized by data consolidator log in manager 514 or data provider log in manager 558 as a correct username, even if the opaque identifier is an opaque identifier generated by the source system at which the thief is attempting to log in.

In one embodiment, the user may log in to data consolidator log in manager 514 or data provider log in manager 558 at any time using the username and password previously established, as described above, and such attempts to log in to the data consolidator system 410 or data provider system 414 will be allowed if the user properly authenticates himself or herself. The properly authenticated user may view any transaction data, as well as initiate transactions if at the data provider system, and change data provider accounts linked with the user data consolidator account if at the data consolidator system, and all other functions available to the user at either system at any time.

As used herein, an "account" may be one or more accounts containing information to which a user is allowed access. The user may be an advisor who has access to information in several accounts that have assets owned by one or more users the advisor serves in an advisory capacity.

What is claimed is:

1. A method of transferring data from a first account at a first computer system to a second account at a second computer system, the method comprising:
receiving at a third computer system, separate from at least one of the first computer system and the second computer system, as part of a first request to arrange at least one transfer of the data from the first account to the second account, a first identifier that uniquely identifies a user of the second account but is not required by a user of the second computer system to log in as that user on the second computer system;
receiving at the first computer system a second request to arrange at least one transfer of the data from the first computer system, said request comprising a second identifier, identifying a user of the first account at the first computer system;
responsive to the second request, authenticating the user of the first account at the first computer system by the first computer system, responsive to the second identifier received as part of the second request;

responsive to the authenticating step and to the second request received, providing from the first computer system to the third computer system a third identifier that uniquely identifies the user of the first account but is not required by a user of the first computer system to log in as that user;

storing on the third computer system the first identifier, associated with the third identifier;

receiving at the third computer system from the second computer system a request to transfer the data from the first account to the second account, said request comprising the first identifier;

at the third computer system, locating the third identifier responsive to the first identifier received;

providing from the third computer system to the first computer system the third identifier;

responsive to the third identifier, providing from the first computer system to the third computer system, the data from the first account corresponding to the request to transfer the data; and sending from the third computer system to the second computer system the data received from the first computer system.

2. The method of claim 1, wherein:

the first request to arrange at least one transfer of the data is received from a fourth computer system, separate from the first, second and third computer systems, via a web page supplied at least in part by the second computer system;

the first request includes the second identifier; and the second request is received from the third computer system.

3. The method of claim 1 wherein the first computer system and the second computer system are parts of a same computer system operated for a single entity.

4. A system for transferring data from a first account at a first computer system to a second account at a second computer system, the system comprising:

a data provider setup manager at the first computer system, the data provider setup manager having an input for receiving a first request to arrange at least one transfer of the data from the first computer system, the first request comprising a first identifier of a user of the first account at the first computer system, the data provider setup manager for providing at an output the first identifier;

a data provider authorization manager at the first computer system, having an input coupled to the data provider setup manager output for receiving the first identifier, the data provider authorization manager for authenticating, via an input/output, the user of the first account at the first computer system responsive to the first identifier received, and for providing at an output an indication of whether the authentication succeeded;

wherein the data provider setup manager input is additionally coupled to the data provider authorization manager output for receiving the indication, the data provider setup manager additionally for, responsive to the indication and to the first request received, providing at the data provider setup manager output a second identifier that uniquely identifies the user of the first account but is not required by a user of the first computer system to log in as that user on the first computer system;

the system additionally comprising:

a matching system setup manager comprising a computer processor at a third computer system, separate from at least one of the first computer system and the second computer system, the matching system setup manager having an input for receiving as part of a second request to arrange at least one transfer of the data from the first account to the second account, a third identifier that uniquely identifies a user of the second account but is not required by a user of the second computer system to log in as that user on the second computer system, and coupled to the data provider setup manager output for receiving the second identifier, the matching system setup manager for providing at an output coupled to a computer storage device, the third identifier, associated with the second identifier;

a matching system data request manager at the third computer system having an input coupled to the second computer system for receiving a request to transfer the data from the first account to the second account, said request comprising the third identifier, and an input/output coupled to the computer storage device, the matching system data request manager, for locating the second identifier, responsive to the third identifier received, and for providing at an output the second identifier; and a data provider data request manager at the first computer system having an input coupled to the matching system data request manager output, for receiving the second identifier, the data provider data request manager for providing at an output the data from the first account corresponding to the second identifier; and wherein the matching system data request manager input is additionally coupled to the data provider data request manager output for receiving the data from the first account, and the matching system data request manager is additionally for sending via the matching system data request manager output the data received at the matching system data request manager input to the second computer system.

5. The system of claim 4, wherein:

the matching system setup manager receives the second request to arrange at least one transfer of the data from a fourth computer system, separate from the first, second and third computer systems, via a web page supplied at least in part by the second computer system; and the second request includes the first identifier; and the first request is received from the third computer system.

6. The system of claim 4 wherein the first computer system and the second computer system are parts of a same computer system and operated for a single entity.

7. A computer program product comprising a non-transitory computer useable medium having computer readable program code embodied therein for transferring data from a first account at a first computer system to a second account at a second computer system, the computer program product comprising computer readable program code devices configured to cause a computer system to:

receive at a third computer system, separate from at least one of the first computer system and the second computer system, as part of a first request to arrange at least one transfer of the data from the first account to the second account, a first identifier that uniquely identifies a user of the second account but is not required by a user of the second computer system to log in as that user on the second computer system;

receive at the first computer system a second request to arrange at least one transfer of the data from the first computer system, said request comprising a second identifier, identifying a user of the first account at the first computer system;

responsive to the second request, authenticate the user of the first account at the first computer system by the first computer system, responsive to the second identifier received as part of the second request;

responsive to the computer readable program code devices configured to cause the computer system to authenticate and to the second request received, provide from the first computer system to the third computer system a third identifier that uniquely identifies the user of the first account but is not required by a user of the first computer system to log in as that user;

store on the third computer system the first identifier, associated with the third identifier;

receive at the third computer system from the second computer system a request to transfer the data from the first account to the second account, said request comprising the first identifier;

at the third computer system, locate the third identifier responsive to the first identifier;

provide from the third computer system to the first computer system the third identifier;

responsive to the third identifier, provide from the first computer system to the third computer system, the data from the first account corresponding to the request to transfer the data; and send from the third computer system to the second computer system the data received from the first computer system.

8. The computer program product of claim 7, wherein:

the first request to arrange at least one transfer of the data is received from a fourth computer system, separate from the first, second and third computer systems, via a web page supplied at least in part by the second computer system;

the first request includes the second identifier; and the second request is received from the third computer system.

9. The computer program product of claim 7 wherein the first computer system and the second computer system are parts of a same computer system operated for a single entity.

* * * * *